United States Patent [19]

Denny et al.

[11] 3,718,498
[45] Feb. 27, 1973

[54] CATALYTIC COMPOSITION

[75] Inventors: Patrick John Denny; Dennis Albert Dowden, both of Stockton-on-Tees, England

[73] Assignee: Imperial Chemical Industries Limited, London, England

[22] Filed: March 29, 1971

[21] Appl. No.: 128,684

[52] U.S. Cl. ...................117/97, 117/23, 117/129, 117/160 R, 126/19 R, 134/2
[51] Int. Cl. ..............................................B44d 1/02
[58] Field of Search.............117/97, 129, 160 R, 23; 126/19 R; 134/2

[56] References Cited

UNITED STATES PATENTS 3,547,098   12/1970   Lee....................................126/19 R
3,549,419   12/1970   Stiles......................................134/2
3,576,667   4/1971    Lee......................................117/129
3,598,650   8/1971    Lee.........................................134/2

Primary Examiner—Edward G. Whitby
Attorney—Cushman, Darby & Cushman

[57] ABSTRACT

By coating the internal surface of a cooking oven with a catalytic composition comprising porous mutually sintered vitreous enamel particles and finely divided transition metal oxides including copper oxide with the oxides of cobalt or manganese or both, the surfaces are rendered substantially self-cleaning. Preferred compositions are disclosed for situations in which (a) build-up of deposits is to be minimized, or (b) rapid removal of deposited fat is required.

9 Claims, 1 Drawing Figure

PATENTED FEB 27 1973 3,718,498
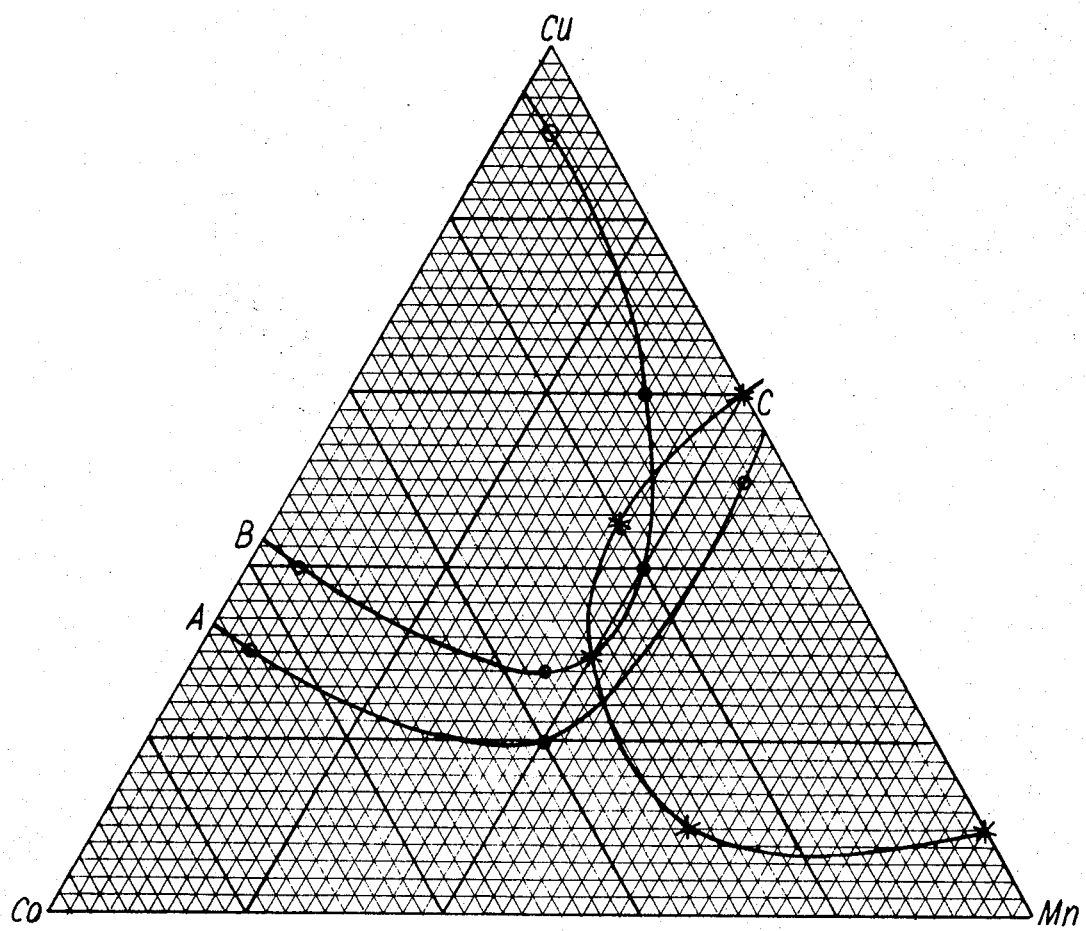
Inventors
PATRICK JOHN DENNY
DENNIS ALBERT DOWDEN
By
Cushman, Darby & Cushman
Attorneys

CATALYTIC COMPOSITION

THIS INVENTION relates to a composition for rendering cooking devices self-cleaning by providing the walls with a catalytic surface.

The problem of cleaning cooking devices such as ovens is an old one and has led to attempts to develop a self-cleaning oven. Pyrolytic methods of achieving this suffer from the disadvantage that they require the oven to be heated to a higher temperature than normal cooking temperatures in order to burn off food residues.

Various catalytic methods of rendering an oven self-cleaning have been attempted by coating the walls of the oven with an oxidizing catalyst active at about normal cooking temperatures. Considerable difficulty has been encountered in finding a combination of metal oxides which when mixed with glass frit and applied to the walls of an oven will form a porous layer which will have the desired hardness, abrasion resistance and porosity without losing the effectiveness of the catalyst over a period of time in operation.

According to the present invention there is provided a cooking oven having an internal surface coating comprising mutually sintered vitreous enamel particles and finely divided transition metal oxides including copper oxide with the oxides of cobalt or manganese or both.

By "finely divided" is meant a particle size well below 76 microns (i.e., passing a 200 mesh BSS sieve) and typically below 25 microns, preferably below 10 or even 2 microns. Such particles are made up of primary particles, which according to X-ray diffraction are of the order of 0.02 microns in diameter, associated together in aggregates. A preferred way of making them is described below.

The copper oxide proportion of the total of copper oxide and other transition metal oxide or oxides is preferably at least 15 percent by metal atoms. The proportions of the oxides depend on what degree of self-cleaning is required. For avoiding build-up of fat decomposition products, mixtures containing at least 5 percent of cobalt oxide or manganese oxide and lying within the area bounded by a line A passing through the points 30:65:5, 20:40:40 and 50:5:45, and more especially mixtures lying within the area bounded by line B passing through the points 40:55:5, 28:36:36, 40:20:40, 60:10:30 and 90:5:5, both on the triangular phase diagram for Cu:Co:Mn, are very suitable.

For effecting quick removal of fat and its decomposition products the proportion of manganese oxide is preferably greater, as represented by the area bounded by line C passing through the points 10:10:90, 10:30:60, 30:30:40, 45:20:35 and 60:0:40. Compositions in or near the regions of overlap of the areas A, B and C provide a useful combination of both types of self-cleaning.

The coating preferably has a porosity in the range 5 to 50 volume percent. It contains preferably 10-35 percent by wt. of the transition metal oxides. The particles of enamel may contain fused-in catalytic material, but this is not necessary for the success of the invention. The coating may contain filling materials to improve porosity, for example zinc oxide, alumina or magnesia. Other transition metals, or metal oxides such as for example those of vanadium, iron, nickel, chromium, molybdenum, tungsten, niobium, tin or bismuth may be present if desired.

The invention provides also a method of making the coated surface of the oven, which comprises forming a slip containing the mutually sinterable vitreous enamel particles and the finely divided transition metal oxides including the oxide of copper with the oxide of cobalt or manganese or both, applying it to a metal surface, drying it and calcining it to effect mutual sintering of the enamel particles to the required porosity. A suitable calcining temperature is in the range 700°–800°C for enamels affording a satisfactory combination of porosity and hardness.

The transition metal oxides are preferably prepared by co-precipitation from a solution of soluble salts preferably with a solution of an alkali metal compound such as the carbonate. After washing, the precipitate is calcined at a temperature sufficient to decompose the precipitate to the metal oxides, e.g., 400°–600°C, and ground if necessary to pass a 200 mesh B.S.S. sieve. The oxides so produced usually require very little grinding and readily break into fine particles when shaken through the sieve. Aggregates passing the sieve are usually broken down further on stirring with the enamel slip.

The mixture of mutually sinterable enamel particles with the oxides as hereinbefore defined, whether in the dry state or aqueous slip state is believed to be a new composition of matter.

The invention is illustrated by the following examples:

EXAMPLE 1

A catalytic composition was prepared by dissolving 60.4 g. of cupric nitrate trihydrate, 62.8 g. of manganous nitrate tetrahydrate and 72.75 g. of cobalt nitrate hexahydrate in 750 ml. of distilled water at 80°–85C, followed by the addition of a sodium carbonate solution at the same temperature made by dissolving 79.5 g. of anhydrous sodium carbonate in 750 ml. of distilled water. The precipitate so obtained was washed thoroughly with hot distilled water, then calcined at 600°C for 2 hours. After calcination the precipitate was ground by shaking through a 200 mesh B.S.S. sieve to break up the few large aggregates present.

Five grams of the ground precipitate and 30g. of enamel slip containing about 20 g. of solid material comprising enamel frit and additives were mixed with sufficient distilled water to produce a fluid paste. A sample of this mixture was flow-coated on to a 7 × 7 cm. square piece of mild steel which had been previously coated with a layer of vitreous non-porous enamel ground coat. The coating was allowed to dry and was heated in an oven at 780°–800°C. The catalytic enamel coating which resulted was about 0.03 cm. thick and was satisfactory in porosity, hardness and adhesion.

Material coated in this way was tested for its efficiency in removing quantities of lard deposited on its surface.

A drop (about 0.017 g.) of molten lard was deposited on a weighed 3 × 3 cm. sample cut from the above coated steel sheet. This was heated in an oven at 225°C for 24 hours, after which it was removed and reweighed in order to calculate the weight loss of lard. Another drop of lard was deposited on the surface and the above procedure was repeated many times. A piece of steel coated with a catalytic oven enamel commercially available and also a piece of enamelled steel similar to that described above but without the catalytic oxides were tested in a similar manner.

The results of these tests are shown in Table 1.

TABLE 1

Cumulative weight of lard residue on coating (grams)

| No. of additions of lard | No catalyst | Catalyst of example | Commercially available catalyst |
|---|---|---|---|
| 0 | 0 | 0 | 0 |
| 1 | 0.0042 | 0.0018 | 0.0028 |
| 2 | 0.0076 | 0.0021 | 0.0052 |
| 3 | 0.0104 | 0.0028 | 0.0072 |
| 4 | 0.0112 | 0.0027 | 0.0084 |
| 5 | 0.0132 | 0.0029 | 0.0095 |
| 6 | 0.0148 | 0.0030 | 0.0104 |
| 7 | 0.0169 | 0.0030 | 0.0120 |
| 8 | 0.0184 | 0.0030 | 0.0130 |
| 9 | 0.0197 | 0.0030 | 0.0136 |
| 10 | 0.0216 | 0.0030 | 0.0138 |

It can be seen that, after the first two lard additions followed by heating, substantially the whole of subsequent additions was removed from the coating made according to the invention. In contrast, on coatings made using no catalytic oxide or using the commercially available catalytic oven enamel, the lard residues continued to build up so as apparently to render the surface non-porous and catalytically inactive.

Similar results were obtained when similar lard-treated samples were heated at 275°C and in tests in which the lard was added every 3 hours instead of every 24 hours.

EXAMPLE 2

A catalytic composition was prepared as in Example 1, except that the quantities of metal salts and sodium carbonate were adjusted so as to produce an oxide mixture having the composition 50 Cu: 25 Co: 25 Mn by metal atoms. Two coated metal sheets were prepared, one of which (A) was heated at 780°C, the other (B) at 720°C, for 3 minutes. The porosities of the coatings as measured by water absorption were 18 percent for A and 27 percent for B.

When tested as in Example 1 the rate of build-up of lard residue at 225°C was as follows:

TABLE 2

| No. of additions of lard | Cumulative weight of residue, grams. | |
|---|---|---|
| | A | B |
| 0 | 0 | 0 |
| 1 | 0.0008 | 0.0011 |
| 2 | 0.0017 | 0.0027 |
| 3 | 0.0021 | 0.0029 |
| 4 | 0.0023 | 0.0031 |
| 5 | 0.0025 | 0.0036 |
| 6 | 0.0028 | 0.0040 |
| 7 | 0.0030 | 0.0044 |
| 8 | 0.0036 | 0.0050 |
| 9 | 0.0039 | 0.0049 |
| 10 | 0.0039 | 0.0051 |
| 11 | 0.0040 | 0.0048 |

Again, the build-up of lard residue had substantially ceased after the eighth drop, and the total residue was much less than that of the coating containing the commercially available catalyst as set forth in Example 1.

EXAMPLE 3

A catalytic composition was prepared as in Example 1, except that the quantities of ingredients were adjusted so as to produce an oxide mixture having the composition 20 Cu: 20Co:60 Mn by metal atoms. A metal sheet was flow-coated as before and heated at 780°C for 3 minutes, to give an enamel layer of porosity 23 percent (Catalyst C).

When tested as in Example 1 the rate of build-up of residue was as follows:

TABLE 3

| No. of additions of lard | Cumulative weight of residue, grams |
|---|---|
| 0 | 0 |
| 1 | 0.0020 |
| 2 | 0.0026 |
| 3 | 0.0040 |
| 4 | 0.0053 |
| 5 | 0.0064 |
| 6 | 0.0066 |
| 7 | 0.0066 |
| 8 | 0.0072 |
| 9 | 0.0068 |
| 10 | 0.0069 |
| 11 | 0.0069 |

EXAMPLE 4

Comparison of catalysts A and C in test of initial rate of lard removal

After application of lard to the previously weighed coated metal sheet, it was placed in an electric oven at 275°C, then withdrawn and weighed at intervals. The weight of lard remaining was expressed as a percentage of the initial quantity and plotted on a graph against time. The initial rate was evaluated from the average slope of the curve between the start and the time required for removal of 50 percent of the lard. The percentages removed and the initial rates were as follows:

TABLE 4

| TIME hours. | Percentage removal Catalyst A | Catalyst C |
|---|---|---|
| 0 | 0 | 0 |
| 0.25 | 21 | 36 |
| 0.5 | 34 | 56 |
| 0.75 | 47 | 67 |
| 1.0 | 54 | 75 |
| 1.5 | 76 | 81 |
| 2.0 | 85 | 84 |
| 3.0 | 88 | 87 |
| 4.0 | 91 | 87 |
| Initial rate % per hour | 61 | 120 |

It is evident that Catalyst C, containing more manganese oxide and less copper oxide, provides a substantially more rapid initial removal of lard.

We claim:

1. A cooking oven having an internal surface coating comprising mutually sintered vitreous enamel particles and, dispersed in said coating, particles of finely divided transition metal oxides including copper oxide in admixture with the oxide of cobalt or manganese or both.

2. An oven according to claim 1 in which the oxides have an average particle size up to 10 microns.

3. An oven according to claim 1 in which the copper oxide constitutes at least 15 percent of the oxides by metal atoms.

4. A cooking oven especially adapted to avoid build-up of fat decomposition products, said oven having an internal surface coating comprising mutually sintered vitreous enamel particles and finely divided transition metal oxides including copper oxide in admixture with the oxide of cobalt or manganese or both, said oxide mixture containing at least 5 percent of cobalt oxide or of manganese oxide and lying within an area bounded by line A on the accompanying triangular phase diagram.

5. An oven according to claim 4 in which the oxide mixture lies within an area bounded by line B on the accompanying triangular phase diagram.

6. A cooking oven especially adapted for quick removal of fat and its decomposition products, said oven having an internal surface coating comprising mutually sintered vitreous enamel particles and finely divided transition metal oxides including copper oxide in admixture with the oxide of cobalt or manganese or both, said oxide mixture lying in the area bounded by line C on the accompanying triangular phase diagram.

7. An oven according to claim 1 in which the coating has a porosity in the range 5 to 50 volume percent.

8. An oven according to claim 1 in which the coating contains 10–35 percent by weight of transition metal oxides.

9. An oven according to claim 1 in which the transition metal oxides of the coating have been prepared by co-precipitation.

* * * * *